July 14, 1964  HIKARU HASEGAWA  3,140,613

DIFFERENTIAL PRESSURE TRANSMITTERS

Filed June 19, 1961

INVENTOR

HIKARU HASEGAWA

BY Irwin S. Thompson

ATTORNEY 3,140,613
DIFFERENTIAL PRESSURE TRANSMITTERS
Hikaru Hasegawa, Hitachi, Ibaragi Prefecture, Japan, assignor to Hitachi Limited, Tokyo, Japan, a corporation of Japan
Filed June 19, 1961, Ser. No. 117,885
Claims priority, application Japan July 26, 1960
2 Claims. (Cl. 73—407)

This invention relates to improvements in differential pressure transmitters to be used for measuring instruments such as flow meters for measuring the quantity of flow using an orifice or venturi tube etc., or such a measuring apparatus for measuring a pressure difference as parameter, and more particularly for use in high pressure purpose.

The principal object of this invention is to provide a compact and accurately operating differential pressure transmitter to be used for measuring instruments.

Figure 1:
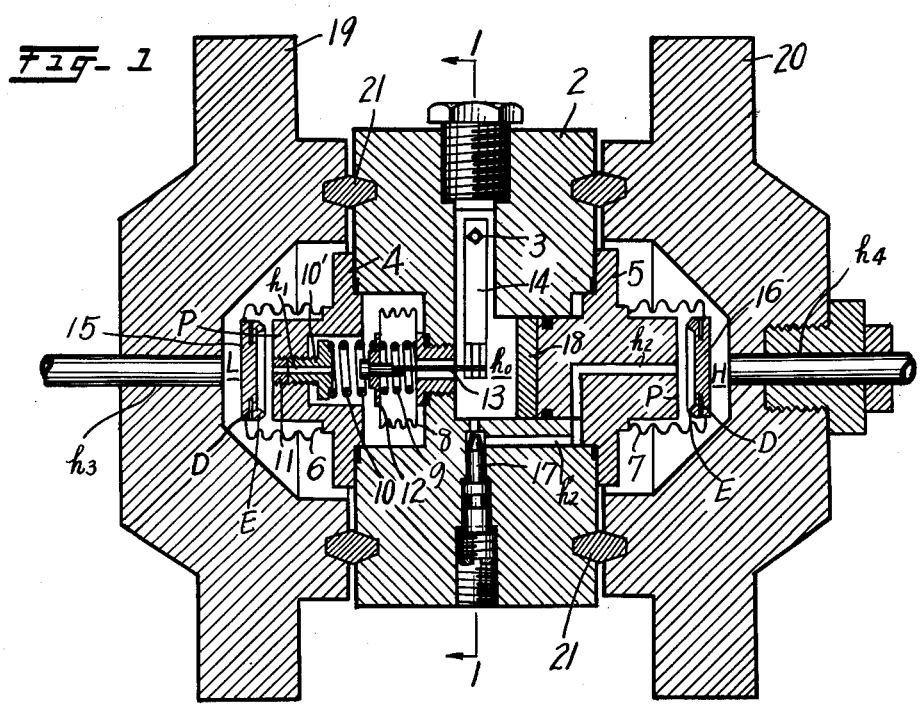
Figure 2:
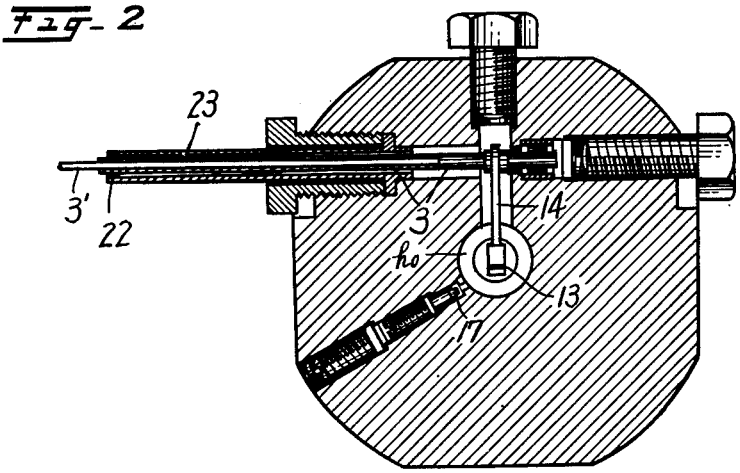

In order that the invention may be readily carried into effect, it will now be described in detail, by way of example, with reference to the accompanying drawings, in which FIG. 1 is a sectional view of the essential parts of the differential pressure transmitter embodying this invention, and FIG. 2 is a sectional view taken on the line 1—1 of FIG. 1.

Referring to the drawing, numeral 2 represents the main body of the transmitter and 3 represents a torque tube arranged at the middle of the main body for responding to the pressure difference. The main body 2 is clamped from opposite sides by means of the end covers 19 and 20 with packing rings 21 fitted between them and the covers are clamped together by means of suitable bolts (not shown). Each of these covers 19 and 20 has holes $h_3$, $h_4$ respectively to receive pressure pipes leading to the low and high pressure sources respectively and the difference in pressures is transmitted. 4 and 5 represent flange pieces secured to the opposite side of the main body 2 respectively provided with central holes $h_1$ and $h_2$ respectively. 6 and 7 represent low and high pressure responsive bellows respectively secured to one end of flange pieces 4 and 5. 15 and 16 represent the end plates secured to the free end of these bellows 6 and 7 respectively and the space inside of these bellows and the chamber in the main body are filled with non-corrosive liquid such as transformer oil. 8 represents a bellows operating responsive to the pressure difference, which is arranged in the main body to prevent the communication of liquid in the bellows 6 and 7, one end of said bellows 8 being fixed to the main body 2, while the other end is made to move freely. The movable end plate 12 of the bellows 8 is acted upon by the operating ends of the springs 9 and 10 arranged in opposite directions with each other in the inside and outside of the bellows 8. 11 represents a screw for adjusting the spring 9 and is advanced or retarded in contact with the tail support 10' for the end of spring 10 and the hole $h_1$ is provided through the screw 11 and the support 10'. The movable end plate 12 of the bellows 8 is provided with a motion transmitting spring 13 projecting from the end plate into the central chamber of the main body and fixing at its end to the free end of the arm 14 which transmits the twisting motion to the torque tube 3 (refer to FIG. 2).

The movable pressure responsive end plates 15 and 16 of bellows 6 and 7 respectively are provided with circumferential groove D for compensating yield of these plates and an inwardly projecting peripheral edge E acting as a flat valve for closing the holes $h_1$ and $h_2$ respectively to stop the flow of liquid in the bellows 6 and 7 when the end plates 15 and 16 are forced to make contact with the end surfaces P of the flange pieces 4 and 5 when the bellows 6 and 7 are shifted by the pressure change.

17 represents a regulating valve provided in the oil duct $h_2'$ which is an extension of the duct $h_2$, for regulating the sectional area of duct $h_2'$ to control the speed of oil passing through the duct in response to the differential pressure and also serves as a damper. 18 is a compensating element provided in the central chamber $h_0$ which communicates with the interior of bellows 7 through the ducts $h_2'$, $h_2$, and with the interior of bellows 8 for compensating the difference in thermal expansion due to the temperature change of oil systems inside and outside of bellows 8 as well as the difference in thermal expansion of metal parts constructing the device. Such adjusting element is the characteristic of the invention.

The flange 19 is connected to a low pressure source through a pipe secured to the hole $h_3$ and a low pressure chamber L is formed in the space inside of the flange 19 and outside of the bellows 6. Similarly flange 20 is connected to high pressure source through a pipe secured to hole $h_4$ and constitutes a high pressure chamber H in the space inside of the flange 20 and outside of the bellows 7. Thus, the present apparatus is communicated to the source of pressure to be measured.

As apparent from FIG. 2, the central chamber $h_0$ encloses the essential mechanism for receiving the last operating parts, for instance, the operating end of the spring 13 secured to the arm 14 which is connected to the torque tube 3, to which one end of the turning spindle 3' is fixed together by welding or the like means, while the other end of the torque tube 3 is independent of the spindle 3', but is fixed at 22 to a supporting sleeve 23 secured to the main body 2 so that the torque tube 3 may be twisted by the arm 14 together with the spindle 3'.

A compensating element 18 is located in the chamber $h_0$ occupying a part of the volume for facilitating the compensation of the volume of liquid.

The operation of the above described device of the invention will be explained in the following:

When the pressure from the pressure source to be measured is transmitted to the high pressure chamber H and low pressure chamber L respectively, then the bellows 7 and 6 are under the action of the pressure, and the movable end plates 16 and 15 are shifted respectively in accordance with the pressure in respective chambers. Then the pressure is transmitted to the liquid enclosed in these bellows 6 and 7 and also to the inside and outside of the bellows 8, and as the result the movable end plate 12 of the bellows 8 is shifted to the left in FIG. 1 due to the pressure difference and such movement of the end plate 12 is transmitted through the spring 13 to the arm 14 to twist the arm, thereby twisting the torque tube 3, and the spindle 3' is turned in accordance with the twist of the tube 3. The extension of the spindle 3' is connected to a suitable mechanism (not shown) for measuring the torsion of the spindle for enabling the measurement of pressure difference as in a known measuring device.

The differential pressure transmitter of this invention has the following special effects, that is, when the quantity of oil sealed in the space outside of bellows 8 and that in the inside of it is equal the volume of the liquid increases by expansion due to the temperature rise, and the bellows 6 and 7 expand to the outside for equal distance so that the bellows 8 is not shifted. Actually, however, it is very difficult and almost impossible to make the oil quantity exactly equal so that some error is indispensable and more particularly it is impossible to compensate the total amount of expansions of the springs 9, 10 and 13 and other metallic constructional parts due to the change of temperatures, which is further important fact. The present inventor considered this point and devised of locating a compensating element 18 or projecting a similar article in the sealed liquid to regulate or compensate the deviation of the volume due to the temperature variation. That is, the quantity of oil in the inside and outside of the bellows 8 is regulated to have such a volume ratio not to cause undesirable twist to the troque tube 3 as the result of temperature change. The compensating element 18 is previously settled to such thickness by its volume to make the amount of oil in the space outside of bellows 8 as well as that inside thereof become equal. In practice, the most suitable element 18 is selected out of a certain number of elements 18 by temperature tests in such a manner that the differential pressure transmitter having its zero point adjusted is put in a thermostatic tank and the difference in pressures applied thereto is maintained at zero for instance, and the previously selected element 18 is put in the central chamber $h_0$ of the transmitter and then the temperature of the thermostatic tank is changed and the volume of the element 18 is determined corresponding to the shifting of the zero point of the transmitter at each temperature, i.e., the volume of the element 18 is so determined that there occurs no change of zero point according to the variation of temperatures. When the volume of element 18 is once determined in such manner, the amount of the thermal expansion of oil is proportional to the temperature change so that the temperature compensation can be automatically attained even though the temperature range, in which the transmitter is located varies. As another means, a part of the wall of the chamber $h_0$ is swelled and the swelled portion is cut off to find the best condition by testing.

Another feature of this invention is the construction of end plates 15 and 16 which act as the closing valve naturally to protect the bellows 8 before it is broken by abnormal high pressure and also it can protect the torque tube 3 and rod 3′. Another specific feature of the invention is the use of a spring 13 for connecting the arm 14 with the movable end plate 12, and though the arm 14 is rigidly connected with the spring 13, yet since the spring is flexible it can follow the accurate deflection of the arm 14 when the bellows 6 and 7 are deformed by the applied pressure difference and correspondingly, the bellows 8 is deformed and the deflection of bellows 8 can be transmitted smoothly to the arm 14 without providing some loose connection between the connecting portions, thus it results in a very accurate responsive operation.

Though in the foregoing an embodiment of this invention is described with reference to the drawing, yet several modifications may be devised within the scope of this invention. For instance, the valve in the inside of the movable plates 15 and 16 for preventing the over pressure may be provided on the side of end surface of the flanges 4 and 5 and also the compensating element 18 may be formed to a special shape and construction in order to develop its function more effectively.

What I claim is:
1. A differential pressure transmitter, which comprises a main body provided with a central chamber, flanges fixed to the opposite side of said main body for forming a high pressure chamber and a low pressure chamber therein, one set of high and low pressure responsive bellows fixed at one end and movable at the other end and fitted to the opposite sides of said main body in spaces provided inside of said high and low pressure chambers respectively, a differential pressure responsive bellows fixed at one end to a part of the main body and movable at the other end, the inside of said differential pressure responsive bellows communicating with the central chamber which is in communication with the inside of said high pressure responsive bellows through a duct, the outside of said differential pressure responsive bellows being in communication with the inside of said low pressure responsive bellows, liquid enclosed inside and outside of said bellows, a movable end plate disposed in said differential pressure responsive bellows, a flexible spring fixed at one end to said movable end plate for transmitting the deflection of said movable end plate to the other end, a cantilever arm fixed at one end to the other end of said spring which other end converts the deformation of said movable end plate to a rotary deformation thereof, a torque tube fixed at one end to the other end of said cantilever and fixed at the other end to a holding member secured to said main body, said one end of said torque tube being twisted, a spindle inserted into said torque tube and fixed thereto at its root for transmitting the pressure difference acting on one set of the cooperating bellows by converting it to a rotary deflection to the outside of the main body, a measuring mechanism operatively connected to said spindle so as to be operated by the rotary deflection transmitted thereto, and a compensating element provided in the central chamber for compensating the temperature variation by adjusting its volume to make the quantities of liquid sealed inside and outside of said differential pressure responsive bellows equal.

2. A differential pressure transmitter, according to claim 3, wherein said low and high pressure responsive bellows comprise a closing valve respectively formed around the inside periphery of movable end plates thereof and making contact with the surfaces of the flange pieces, and a circumferential groove provided for said closing valve for preventing its yield.

References Cited in the file of this patent
UNITED STATES PATENTS

| | | |
|---|---|---|
| 2,008,627 | Place et al. | July 16, 1935 |
| 2,072,617 | Cate | Mar. 2, 1937 |
| 2,365,573 | McGay | Dec. 19, 1944 |

FOREIGN PATENTS

| | | |
|---|---|---|
| 523,117 | Great Britain | July 5, 1940 |